US011498490B1

(12) United States Patent
Dexter

(10) Patent No.: US 11,498,490 B1
(45) Date of Patent: Nov. 15, 2022

(54) CARGO ATTACHMENT ASSEMBLY

(71) Applicant: Tim Dexter, Orland, CA (US)

(72) Inventor: Tim Dexter, Orland, CA (US)

(*) Notice: Subject to any disclaimer, the term of this patent is extended or adjusted under 35 U.S.C. 154(b) by 0 days.

(21) Appl. No.: 17/477,863

(22) Filed: Sep. 17, 2021

Related U.S. Application Data

(60) Provisional application No. 63/258,724, filed on May 24, 2021.

(51) Int. Cl.
*B60R 7/02* (2006.01)
*B60R 11/00* (2006.01)
*B60P 7/08* (2006.01)
*B60R 7/08* (2006.01)

(52) U.S. Cl.
CPC ............... B60R 7/02 (2013.01); B60R 11/00 (2013.01); *B60P 7/0815* (2013.01); *B60R 7/08* (2013.01); *B60R 2011/0003* (2013.01); *B60R 2011/0012* (2013.01); *B60R 2011/0019* (2013.01); *B60R 2011/0049* (2013.01); *B60R 2011/0057* (2013.01); *B60R 2011/0059* (2013.01); *B60R 2011/0063* (2013.01)

(58) Field of Classification Search
CPC ..... B60R 7/02; B60R 7/08; B60R 2011/0003; B60R 2011/0019; B60R 2011/0012; B60R 2011/0049; B60R 2011/0059; B60P 7/0815; A45F 5/02
USPC .............................. 224/275, 182; 248/220.31
See application file for complete search history.

(56) References Cited

U.S. PATENT DOCUMENTS

| | | | | | |
|---|---|---|---|---|---|
| 5,415,457 | A | * | 5/1995 | Kifer ...................... | B60R 7/043 224/543 |
| 5,626,244 | A | * | 5/1997 | Mesna .................. | E04H 17/066 211/85.7 |
| 6,105,839 | A | * | 8/2000 | Bell ........................ | B60R 7/043 220/9.3 |
| 6,679,188 | B1 | * | 1/2004 | Spagnoli, Jr. .......... | B60N 3/004 108/44 |
| 6,994,236 | B2 | * | 2/2006 | Hsu ...................... | B60R 11/0235 297/217.3 |
| 7,798,463 | B2 | * | 9/2010 | Morgenroth .......... | A47F 5/0846 211/106.01 |
| 7,845,604 | B2 | * | 12/2010 | Connor, Jr. ............. | A47G 7/044 248/219.3 |
| 8,141,722 | B2 | * | 3/2012 | Heroux .............. | A47G 25/1457 211/116 |
| 8,596,473 | B2 | * | 12/2013 | Newbould ............... | A47K 1/09 211/88.01 |
| 8,646,625 | B2 | * | 2/2014 | Wang ..................... | A47G 25/06 211/106.01 |
| 9,340,143 | B2 | * | 5/2016 | Stakoe .................. | B60P 7/0876 |
| 9,581,782 | B2 | * | 2/2017 | Abby ..................... | H04Q 1/064 |
| 9,681,781 | B2 | * | 6/2017 | Hurley .................. | A47F 5/0876 |

(Continued)

*Primary Examiner* — Justin M Larson
(74) *Attorney, Agent, or Firm* — Apex Juris, PLLC; R Lynette Wylie

(57) ABSTRACT

An attachment assembly for storage and organization of light cargo including a first article having an open surface or a vertical panel, a semi-rigid elongate strip having a series of equally spaced apart aperture slots that may be pivotable about a live hinge, fastener(s) with an configured for releasable coupling with at least one of the plurality of apertures and an opposing end is configured for connection to a second article, and a releasable couplable stay member so as to hold the article against the first article.

17 Claims, 7 Drawing Sheets

(56) References Cited

U.S. PATENT DOCUMENTS

| | | | | |
|---|---|---|---|---|
| D821,955 S | * | 7/2018 | Dexter | D12/221 |
| 10,136,767 B2 | * | 11/2018 | Hurley | A47K 5/18 |
| 10,966,891 B2 | * | 4/2021 | Kitt | A61G 12/008 |
| 11,279,421 B1 | * | 3/2022 | Hoogendoorn | B60R 9/06 |
| 11,351,925 B2 | * | 6/2022 | Johnson | B60R 15/02 |
| 2006/0049124 A1 | * | 3/2006 | Wang | A47B 43/003 |
| | | | | 211/113 |
| 2011/0186607 A1 | * | 8/2011 | Ward | B60R 7/08 |
| | | | | 224/275 |

* cited by examiner

CARGO ATTACHMENT ASSEMBLY

CROSS-REFERENCE TO RELATED APPLICATION

This application claims priority to and incorporates by reference the disclosure of U.S. Provisional Patent Application No. 63/258,724, filed May 24, 2021.

TECHNICAL FIELD

The present invention relates to storage and management systems and more particularly to a cargo attachment assembly wherein article(s) are attached to a fastener strip having a plurality of open slots or apertures adaptively dimensioned and spaced for receiving corresponding fasteners for attachment of articles to a surface of a vehicle interior, storage platform or wearable article such as a backpack, waist pack or bag.

BACKGROUND OF THE INVENTION

Conventional cargo storage and carrying systems utilize various combinations of fasteners, tethers and receiver mechanisms for secure and accessible management of articles. Heavy freight systems have typically utilized hooks, straps and lines to tether cargo to surfaces of a vehicle or towed container interior. Attachment mechanism are designed to save space, e.g., by employing underutilized spaces, reduce damage, improve access and to the freight or cargo.

Unfortunately, however, such cargo management systems are cumbersome and bulky. Their sizeable weight and configuration, such truck cargo attachment systems are not amenable to portable use. Freight cargo systems are designed for heavy loads and therefore commensurately large, dedicated and fixed systems not amenable to portable applications. Attachment systems for lighter articles have also utilized fasteners, such as, for example, hook-and-loop fastener strips, straps, lines, yieldable clasps and carabiners, to releasably secure articles to a second surface. One example is the MOLLE, or Modular Lightweight Load-carrying Equipment system for attaching articles to load-bearing equipment and rucksacks derived from the use of PALS, or Pouch Attachment Ladder System, nylon webbing stitched for the attachment of various compatible pouches and accessories.

Although MOLLE and other similar prior art cargo management systems are designed for carrying lighter objects and are portable, the textile straps' pliability result in a yielding droop. The malleable composition weakens the structural integrity of the attachment platform and detracts from the aesthetic. Furthermore, due to the pliable composition of MOLLE webbing, insertion and threading of straps, hooks or other fasteners through the soft and malleable peripheries of the opening is awkward and inefficient, typically requiring movement of the article to attain angling conducive to threading a strap or fastener into a corresponding aperture or slot. Often, securing the fastener entails several attempts. After attachment, attached objects hang free and swing about when subject to forces emanating from motion or impact. Thus, any fragile objects are vulnerable to damage and the force of heavy objects may exert pressure or damage on nearby people or surfaces. Moreover, the appearance of jostling objects is unsightly and audible collisions of carried objects may be a nuisance.

It can thus be readily surmised that problems with prior art cargo management systems persist. Thus, there exists an ongoing need for a superior cargo attachment system addressing such and other drawbacks and disadvantages of the prior art.

SUMMARY OF THE INVENTION

The present invention provides a platform with one or more semi-rigid attachment strips having a plurality of apertures dimensioned and spaced to accommodate corresponding fasteners that may be attached to packs, bags or other containers and various articles wherein various embodiments employ a live hinge facilitating ready coupling and holding the fasteners within the corresponding apertures. Further facilitating aperture/fastener insertion and coupling in some embodiments is a thickened or beaded bottom edge to keep the lower portion of the elongate strip slightly askew from the surface of the platform.

The apertures in preferred embodiments of this attachment system are slots elongated in a horizontal direction and are equally spaced apart and arranged to accommodate one or more attached articles. The vertical panel and attachment strips may be dimensioned to fit a respective surface of a vehicle interior, cargo container or trailer, a vest, pack, or other storage or organizational unit to provide secure mounting and storage of accoutrements that may be readily detached and accessed. The semi-rigid attachment strip and panel may be attached to another surface via stitching or laser seaming, hook-and-loop or Velcro®, magnetic fasteners or any suitable commercially available attachment mechanism for durable joining of the materials used.

The various embodiments of this inventive cargo attachment assembly includes a vertical panel or a first article having an open surface with a semi-rigid elongate strip having a front surface and a rear surface integrally extended between an upper edge and a lower edge. The elongate strip has a series of equally spaced apart aperture slots disposed in the semi-rigid elongate strip below the second seam and fastener(s) having an elongate body portion extended between a first end and a second end, wherein the first end is configured for releasable coupling with at least one of the plurality of apertures and the second end is configured for connection to a second article.

Alternative embodiments further include a stay member having releasably couplable first and second portion for holding attached cargo against the vertical panel or first article. The stay member may include a hook-and-loop fastener strip, wherein a first portion of the stay member is one of either a hook or loop fastener portion of the hook-and-loop fastener strip and wherein a second portion of a corresponding other of either a hook or loop portion of the hook-and-loop fastener strip is releasably couplable with the first portion so as to hold the second article against the first article.

A yet further feature of this cargo attachment assembly is a magnetic portion affixed to the article or vertical panel and a corresponding magnetic catch affixed to a surface of an attached article such that the magnetic catch is capable of being releasably coupled with the magnetic portion to thereby secure the second article against the first article. The magnetic portion may be the stay or an auxiliary mechanism for keeping an article of cargo in place.

A further feature is provided by a live hinge activated through the upward and downward action exerting pressure on the elongate strip when coupling a fastener into apertures disposed therein. In pivoting the live hinge, the pushing action tilts the apertures to face the open end of a fastener and thereby facilitates insertion and coupling to the aperture. Moreover, the live hinge subsequently pivots open in response to the downward pressure keeps the attached article from against the vertical panel and prevents inadvertent horizontal movement that could cause inadvertent detachment of the fastener from the aperture.

In particularly preferred embodiments, this semi-rigid mounting strip provides a plurality of apertures configured and spaced below a live hinge mechanism for facilitating ready and secure mounting of articles and fasteners such as hooks and straps onto a panel. The semi-rigid strip may be affixed to the live hinge or directly seamed onto a vertical panel of a vehicle interior storage panel. Some further embodiments may employ the cargo attachment system claimed and described herein to a portable pack, bag or satchel, luggage vests and backpacks, or a surface, platform or matrix for lining a vehicle or storage interior, etc.

These and other aspects, features and details of the invention may be understood from a review of the detailed description, drawing figures, and claims, all of which comprise disclosure of the invention.

DETAILED DESCRIPTION OF THE ILLUSTRATED EMBODIMENTS

Figure 1:
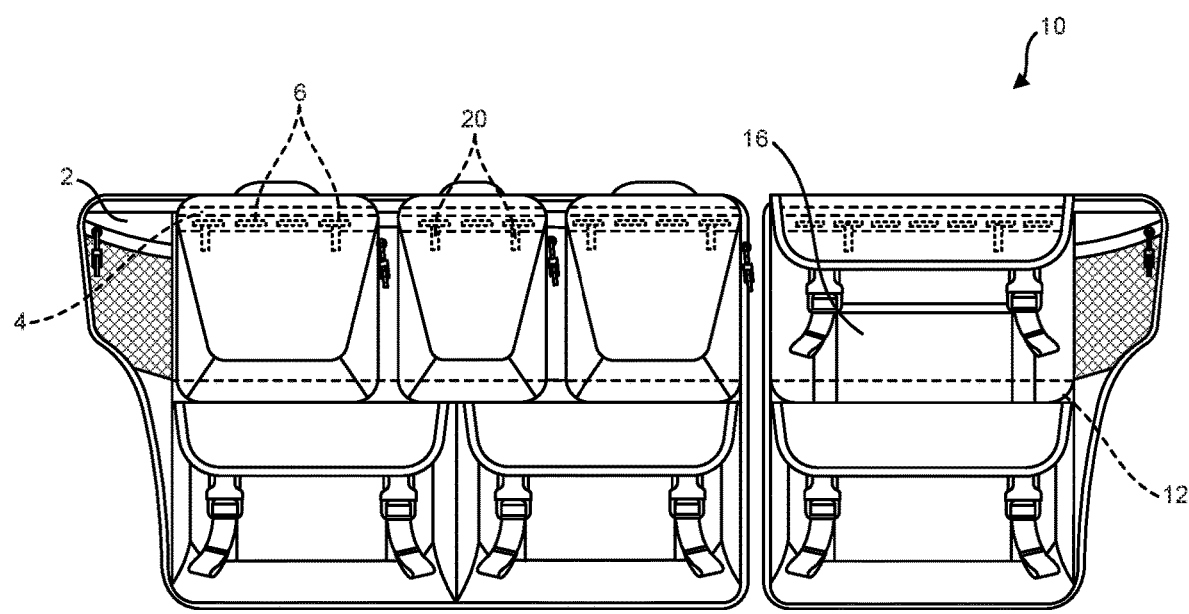
FIG. 1 depicts an embodiment of this cargo attachment system having a vertical panel with carriers attached via coupling of fasteners and corresponding apertures of an upper fastener strip shown in phantom lines.

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, representative examples of features of the present cargo attachment assembly and system are disclosed to illustrate aspects of the claimed invention. Related features in the examples may be identical, similar, or dissimilar. The reader should understand that a given feature need not be the same or similar to the specific portrayal. It should therefore be understood that the representative embodiment illustrated in FIGS. 1-3B is adapted to an automobile and specifically a sport utility vehicle. However, it should be understood that the claimed and described features of other embodiments of the claimed invention may be adaptable to other applications, including, for example, trailers, storage containers and units, luggage, backpacks, vests, household containers, or any other storage and organizational articles. In addition to the packs and bags attached in the illustration, the fasteners can further be used for direct or indirect attachment of various articles such as, for example, ropes, slings, vehicle recovery gear, flashlights, climbing, fishing or camping gear, weapons, tools and containers.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used in the specification and in the claims, "or" is synonymous to "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to.

As used herein, "fastener," "stay," or "catch" refers to any suitable connective device or material for holding an article in place by reducing motion or associated audible noise and includes at least a first and a second member with releasably fastenable or couplable magnetic component surfaces. For example, a hook-and-loop fastener such as disclosed in the drawings and herein includes a "hook" component and a "loop" or "pile" component. VELCRO® is a common brand name under which such material is produced and sold. Fabric used as the loop or pile component may be material not especially intended for such use, but having sufficient nap to engage the hook component. Alternatively, corresponding releasably couplable surfaces be provided by magnetic/metallic material. In addition to "hook-and-loop" or magnetic engagement material, other releasably couplable fastener, stays, or mounts could include catch, hook, clasp, straps, lines, D-ring or carabiner, tethers and similar detachably engageable closure devices. Therefore, it is contemplated that the claims include the various commercially available fasteners adaptable to the present cargo attachment assembly.

As used herein, "semi-rigid" refers an integrally stiff yet flexibly yieldable material capable of bending upon impact or when subject to torque. In context of the cargo management system described and claimed herein, the semi-rigid material as provided in the attachment strip or rail is sufficient to position a corresponding component into position. The semi-rigid material may include plastic, resins, rubber, textile, wood, metal and any other suitable material. As used for the elongate strip as described and claimed herein, the material preferably includes a hard polymeric or plastic composition such as a high density polyethylene (HDPE) or polypropylene (PP).

As used herein, a "live hinge" refers to a foldable fabric of suitable thickness and composition to provide a pivotable hinge mechanism. The fabric employed for such a live hinge may be interwoven or interfaced with a substance or material to stiffen and thereby reduce the malleability of the material and provide defined linear pivoting mechanism. For example, as applied in the specification and claims herein, the live hinge is attached to the fastener strip and is thereby activated through the upward and downward movement upon coupling a fastener in order to enhance access for ready insertion and coupling with a corresponding aperture slot and then pivotably adapts to the weight of the attached cargo pack so as to direct pressure to hold the cargo against the surface of the exposed panel.

As used herein, an "article", including a "first article" and "second article", includes any item or object of a suitable composition, structure and purpose for the described or claimed feature. For example, a "first article" may include anything with a surface or other platform whereon an elongate strip as described and claimed herein, can be attached and will support an attached "second article". Similarly, a "second article" includes anything that is capable of being adapted for attachment to aperture slot of the recited elongate strip such as, for example, ropes, slings, vehicle recovery gear, flashlights, climbing, fishing or camping gear, weapons, tools, locks and keys, and containers as well as packs and bags such as illustrated in the various figures.

Now referring to the various figures illustrating an exemplary embodiment of the claimed invention as illustrated in FIGS. 1-4B, attachment assembly 10 for storage and organization of light cargo, includes a platform member in the form of a vertical panel 2 including a semi-rigid elongate strip 4 having a front surface and a rear surface integrally extended between opposed an upper and a lower edge.

Figure 2:
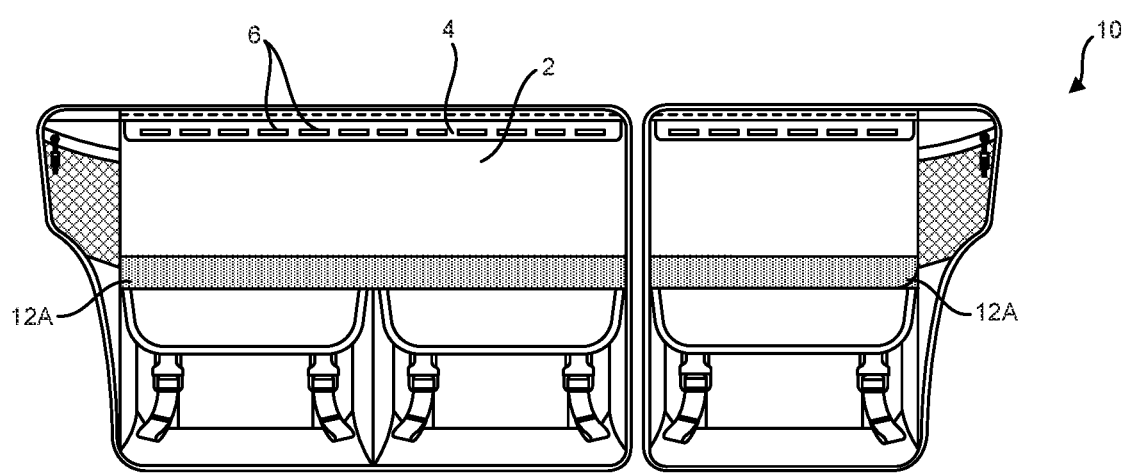
FIG. 2 depicts the embodiment of the attachment system in FIG. 1 with the carriers in a detached position wherein the aperture strip and its series of aperture slots are exposed.

Referring first to FIGS. 1 and 2, therein is shown at 10 a vertical panel of a first article 1 according to one embodiment of the present invention having a strip 4 having a front surface and rear surface 14. Fastener strip 4 has a series aperture slots 6. In this exemplary embodiment, slots 6 are arranged in a series pattern in a row disposed along a lower portion of the elongate strip 4. As most clearly illustrated in FIG. 2, aperture slots 6 are equally spaced and elongated in a horizontal direction. Alternative embodiments may include any number of aperture slots and/or multiple rows of aperture slots that are configured and position for detachable engagement with corresponding fasteners.

Figure 2A:
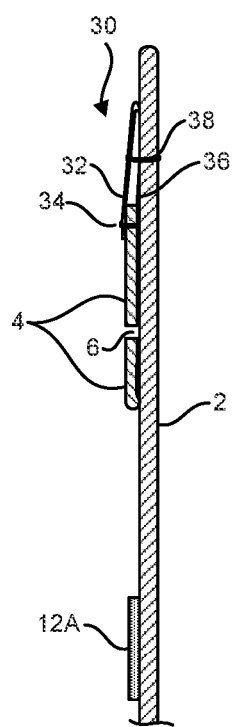
FIG. 2A is a cross section view illustrating the live hinge and fastener strip of FIG. 2 in a detached position.
Figure 2B:
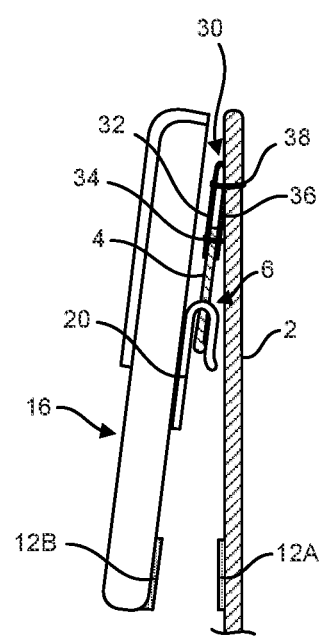
FIG. 2B is a cross section view illustrating coupling of the fastener with the fastener strip to thereby secure the carrier in an attached position.

Now referring to FIGS. 2A and 2B, the attachment strip 4 is affixed to a live hinge 30 having a front flap 32 and a rear flap 36 pivotable about a linear seam 38 affixing the live hinge to the vertical panel along a substantially parallel axis above the upper edge of the elongate strip 4 and a second seam 34 affixing a lower edge of the front flap 32 along a parallel orientation proximate to the upper edge of the elongate strip 4.

Figure 3A:
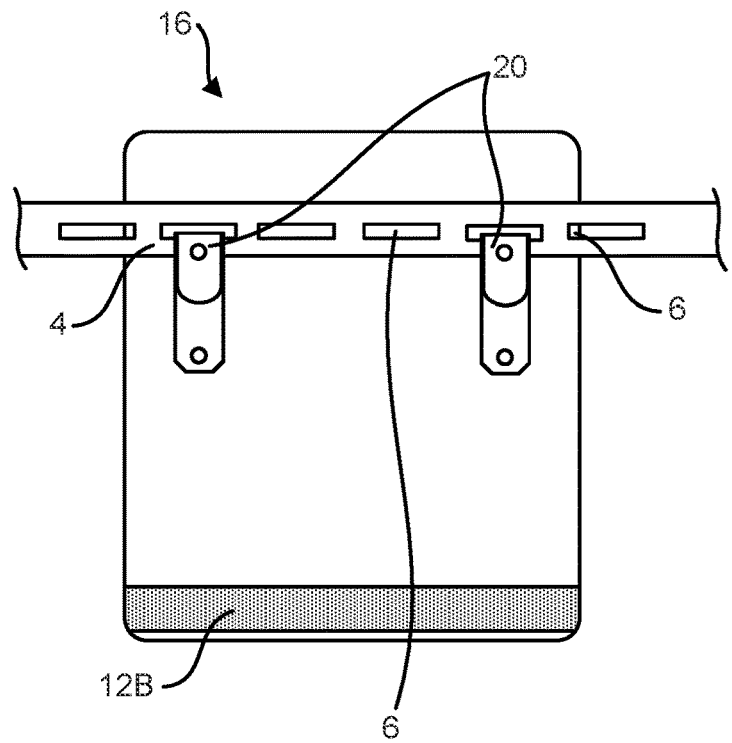
FIG. 3A is a back view of the pack showing how the fastener and aperture slot of the illustrated embodiment in an attached position.
Figure 3B:
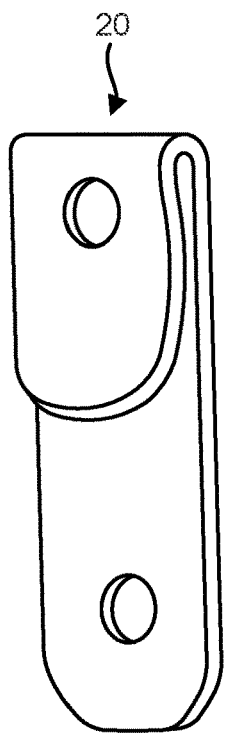
FIG. 3B is a perspective view of the fastener of the illustrated embodiment shown separated from the article and fastener strip.

As illustrated in FIGS. 3 and 3B, fastener 20, illustrated as a J-hook, has an elongate body portion extended between a pair of opposed ends, wherein at least one end is configured for releasable coupling with at least one of the plurality of apertures and the other end is configured for connection to an article 16 so it is releasably coupled to the vertical panel or first article 2.

Figure 5:
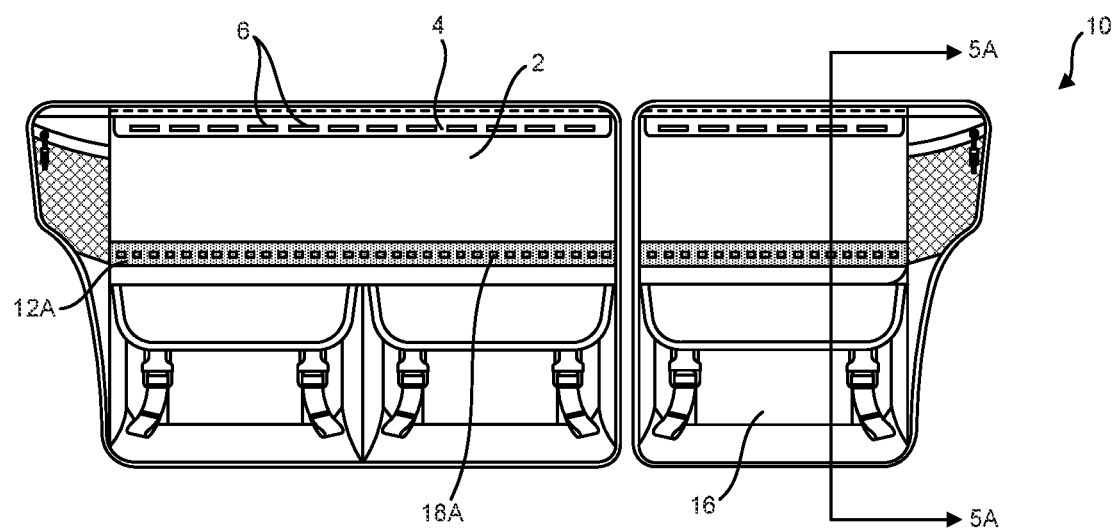
FIG. 5 illustrates the cargo attachment system of FIG. 4 with the upper fastener strip when the carriers are detached.
Figure 5A:
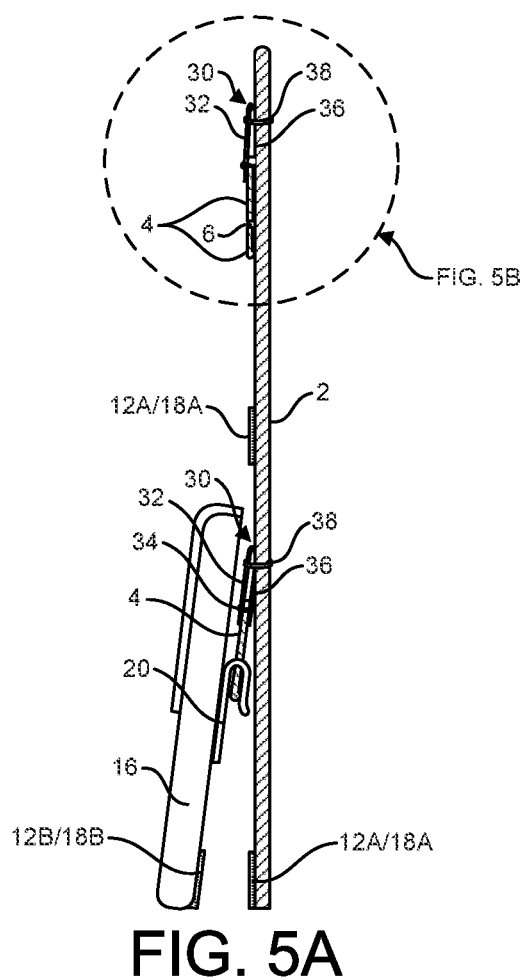
FIG. 5A is a cross-section view of FIG. 5 taken along line 5A-5A.
Figure 5B:
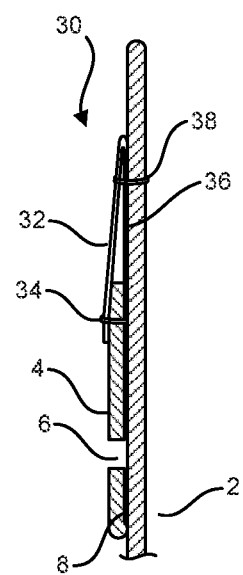
FIG. 5B is a close-up view of the encircled upper elongate strip of FIG. 5A in a detached position illustrating the details of the live hinge of the illustrated embodiment.

As can be readily surmised by the juxtaposition of aperture slot 6 and fastener 20 illustrated in FIGS. 2A and 2B cross sectional views of FIG. 2 and FIGS. 5A and 5B cross sectional views of FIG. 5, live hinge 30 is activated by lifting followed by lowering of fastener strip 4 when coupling a fastener into aperture slot 6. Hence, it can thus be seen that the live hinge enhances access for ready insertion and coupling of fastener 20 and corresponding aperture slot 6. Following coupling of fastener 20, live hinge 30 further adaptively pivots downward in response to the weight of the attached article 16 so as to direct pressure to hold the cargo against the surface of the vertical panel of the first article 2. The pressure also prevents inadvertent horizontal or upward motion and subsequent inadvertent decoupling of the attached article 16 illustrated in the various drawings as a pack which is thereby kept in an upright, coupled position.

Referring again to FIGS. 2A and 2B, the illustrated embodiment features a lower edge of the elongate strip 4 that is thickened at least beyond the rear surface of the semi-rigid attachment strip so as to keep a portion of the rear surface toward the lower edge slightly askew from the vertical panel. In this exemplary embodiment, a thickened bead 8 integrally affixed along the lower edge of the elongate strip of the semi-rigid attachment strip 4 keeps a rear portion of the rear surface askew in order to facilitate ready coupling of fastener 20 and attachment strip 4.

The various figures further feature stay member 12/12A/12B shown as a hook-and-loop fastener. As illustrated, a hook or loop strip 12A, which is preferably the loop portion, is affixed to vertical panel 2 and a corresponding other of either a hook or loop strip 12B, which is preferably the hook portion, is detachably engageable with the first strip 12A such that the article 16 is capable of being releasably coupled to the vertical panel 2 so as to hold the article 16 against the vertical panel or first article 2.

In alternative embodiments the stay 12 may be provided by an interlaced, embedded or otherwise affixed catch 18 wherein a portion of the magnetic tab 18A is a inserted within stay member 12A and a second portion of the catch 18B, capable of magnetic releasable coupling with the first portion 18A, is affixed to a surface of the article 16 to thereby hold article 16 against the surface of the vertical panel/first article 2.

In alternative embodiments stay 12 and catch 18 may be provided solely by a magnetic strip or hook-and-loop fastener, or combinations of fasteners.

Figure 4:
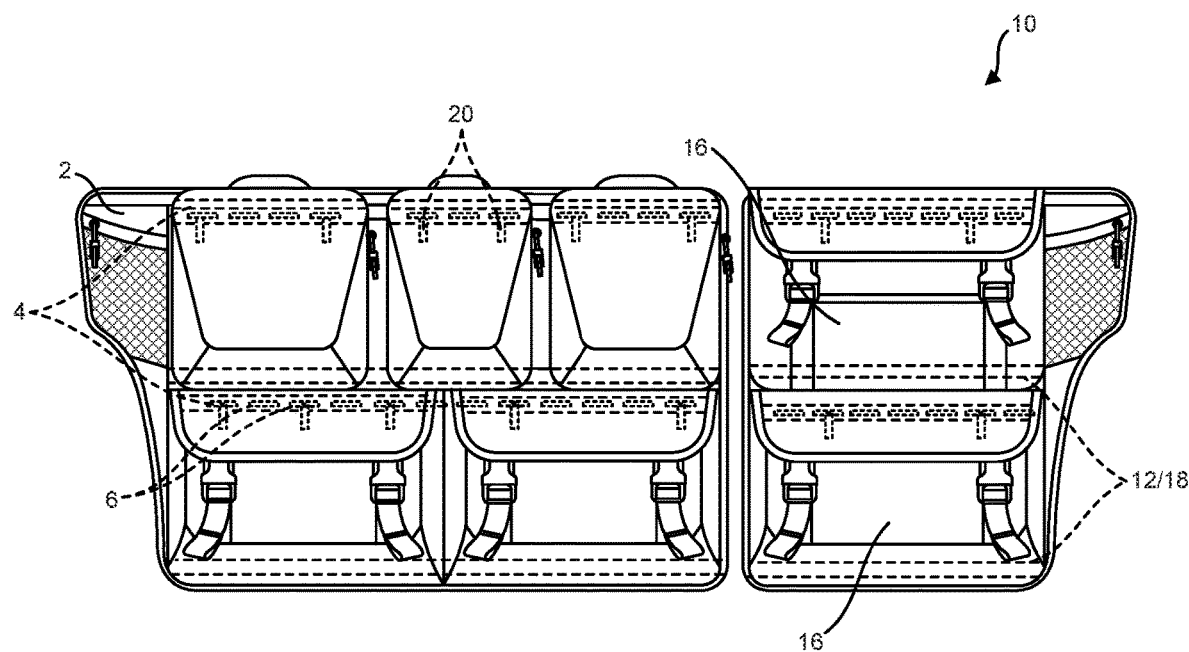
FIG. 4 is a front perspective view of an embodiment of this cargo attachment system having an upper and lower fastener strip with apertures with carriers in an attached position.

Now referring to FIGS. 4-5B, an embodiment wherein stay 12 is a hook-and-loop fastener and catch 18 are magnetized fasteners 18A and 18B interwoven or sewn on stays 12A and 12B respectively. As can be readily surmised, the dual fastening system provides an enhanced coupling to keep the pack from movement even with sharp jolts and impacts.

Alternative embodiments may incorporate fasteners into hardware, strips, or the vertical panel via interlacing or interfacing or otherwise conjoining the releasably coupled stay, catch or fastener mechanism.

A suitable material for the fabric employed in the claimed invention including the vertical panel and live hinge could be any adaptable and durable textile, plastic or other material as well as any combination thereof with properties suitable for the purpose of the component. For example, panel 2 may include for example and without limitation a stiff canvas or mesh made of natural or synthetic material, nylon, thermoplastic polyurethane (TPU) or other suitable polymeric or other material which may incorporate UV reflection or a nylon or other polymer having a thermoplastic elastomer (TPE) or polyurethane coating to enhance desired properties including durability. Moreover, in some embodiments, performance may be enhanced by application of a thermoplastic elastomer (TPE) or polyurethane (PU) coating. It is understood that the aforementioned materials are exemplary illustrations and not inclusive of appropriate materials for fabrication of the claimed invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used.

Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article or material described herein. In addition, any combination of two or more such features, systems, articles, materials, articles, tools, supplies, gear, if such features, systems, articles, or materials are not mutually inconsistent, is included within the inventive scope of the present disclosure.

The invention claimed is:

1. An attachment assembly for storage and organization of light cargo, comprising:
a vertical panel;
a live hinge pivotable about a linear seam affixed to the vertical panel along a substantially horizontal axis wherein a front flap extends to form an open edge extending downwardly from the linear seam on the vertical panel;
a semi-rigid elongate strip having a front surface and a rear surface integrally extended between an upper edge and a lower edge, wherein a second seam proximate to the open edge of the front flap affixes the open edge in parallel, aligned orientation proximate to the upper edge of the elongate strip;
a plurality of aperture slots disposed along a portion of the elongate strip positioned below the second seam; and
a fastener having an elongate body portion extended between a pair of opposed ends, wherein at least one end is configured for releasable coupling with at least one of the plurality of apertures and the other end is configured for connection to an article such that the article is capable of being releasably coupled to the vertical panel.

2. The attachment assembly of claim 1, wherein the aperture slots are elongated in a horizontal direction.

3. The attachment assembly of claim 2, wherein the aperture slots are equally spaced.

4. The attachment assembly of claim 3, wherein the lower edge of the elongate strip includes a thickened portion extending beyond the rear surface of the semi-rigid attachment strip so as to keep a portion of the rear surface toward the lower edge slightly askew from the vertical panel.

5. The attachment assembly of claim 4, wherein the thickened portion is a bead integrally affixed along the lower edge of the elongate strip of the semi-rigid attachment strip so as to keep a portion of the rear surface toward the lower edge slightly askew from the vertical panel.

6. The attachment assembly of claim 1, further comprising a stay member, wherein a first portion of the stay member is affixed to the vertical panel and a corresponding second portion of the stay member is configured to affix to a surface of the article such that the second portion is capable of being releasably coupled with the first portion so as to hold the article against the vertical panel.

7. The attachment assembly of claim 6, wherein the stay member comprises a hook-and-loop fastener, wherein the first portion of the stay member is one of either a hook or loop fastener portion and wherein the second portion is another of either a hook or loop portion.

8. The attachment assembly of claim 6, wherein the stay member is a magnetic portion affixed to the vertical panel and a corresponding magnetic catch configured to affix to a surface of the article such that the magnetic catch is capable of being releasably coupled with the magnetic portion so as to hold the article against the vertical panel.

9. An attachment assembly for storage and organization of light cargo, comprising:
a first article having an exposed surface;
a semi-rigid elongate strip having an opposing front surface and a rear surface extended between an upper edge and a lower edge, wherein the elongate strip is affixed to the exposed surface along a substantially horizontal axis toward the upper edge and wherein a plurality of apertures are disposed toward the lower edge of the elongate strip;
a fastener having an elongate body portion extended between a pair of opposed ends, wherein at least one end is configured for releasable coupling with at least one of the plurality of apertures and the other end is configured for connection to a second article.

10. The attachment assembly of claim 9, wherein the apertures are elongated in a substantially horizontal direction.

11. The attachment assembly of claim 10, wherein the apertures are equally spaced.

12. The attachment assembly of claim 11, the lower edge of the elongate strip is thickened at least beyond the rear surface of the semi-rigid attachment strip so as to keep a portion of the rear surface toward the lower edge slightly askew from the exposed surface.

13. The attachment assembly of claim 9, further comprising a stay member, wherein a first portion of the stay member is affixed to the vertical panel and a corresponding second portion of the stay member is configured to affix to a surface of the second article such that the second article is capable of being releasably coupled so as to hold the second article against the first article.

14. The attachment assembly of claim 13, wherein the stay member is a hook-and-loop fastener, wherein the first portion of the stay member is one of either a hook or loop fastener portion and wherein the second portion of another of either a hook or loop portion is releasably coupled with the first portion such that the second article is capable of being releasably coupled to the exposed surface so as to hold the second article against the first article.

15. The attachment assembly of claim 13, wherein the stay member is a magnetic portion includes a magnetic portion affixed to the first article and a magnetic catch configured to affix to to the second article such that the second article is capable of being releasably coupled with the magnetic portion so as to hold the second article against the first article.

16. An attachment assembly for storage and organization of light cargo, comprising:
- a first article having an open surface;
- a live hinge pivotable about a linear seam affixed to the vertical panel along a substantially parallel axis wherein an opposed front flap and a rear flap extend to form equidistant open edges of the live hinge;
- a semi-rigid elongate strip having a front surface and a rear surface integrally extended between an upper edge and a lower edge, wherein a second seam proximate to the open edges of the front flap and the back flap affixes the open edges in parallel, aligned orientation proximate to the upper edge of the elongate strip;
- a series of equally spaced apart aperture slots disposed in the semi-rigid elongate strip below the second seam;
- at least one fastener having an elongate body portion extended between a first end and a second end, wherein the first end is configured for releasable coupling with at least one of the plurality of apertures and the second end is configured for connection to a second article; and
- a stay member comprising a hook-and-loop fastener strip, wherein a first portion of the stay member is one of either a hook or loop fastener portion of the hook-and-loop fastener strip and wherein a second portion of a corresponding other of either a hook or loop portion of the hook-and-loop fastener strip capable of being releasably coupled with the first portion so as to hold the second article against the first article.

17. The attachment assembly of claim 16, further comprising a bead integrally affixed along the lower edge of the elongate strip of the semi-rigid attachment strip so as to keep a portion of the rear surface toward the lower edge slightly askew from the vertical panel.

\* \* \* \* \*